Feb. 25, 1941.   J. M. ROBERTS   2,233,111
DELIVERY TRUCK
Filed May 29, 1939   2 Sheets-Sheet 1
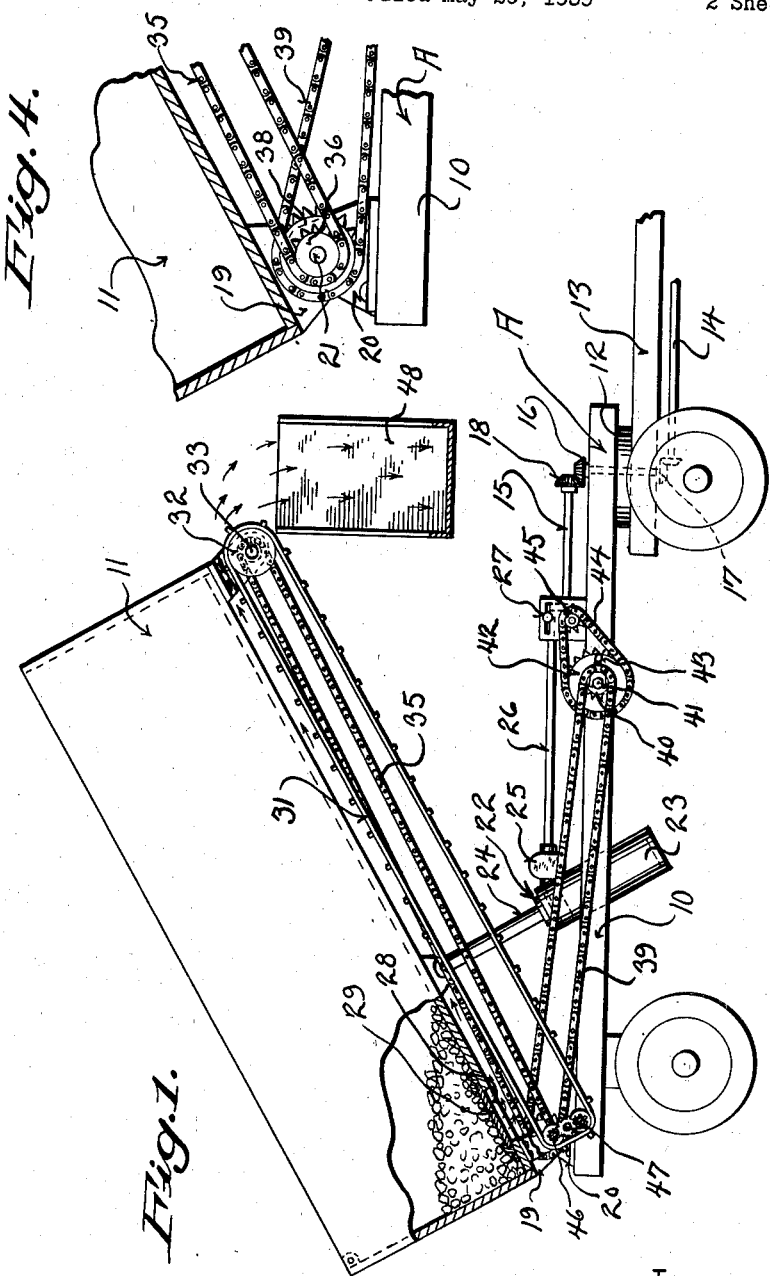
Inventor
J. M. Roberts
By
Attorneys Feb. 25, 1941.  J. M. ROBERTS  2,233,111
DELIVERY TRUCK
Filed May 29, 1939  2 Sheets-Sheet 2
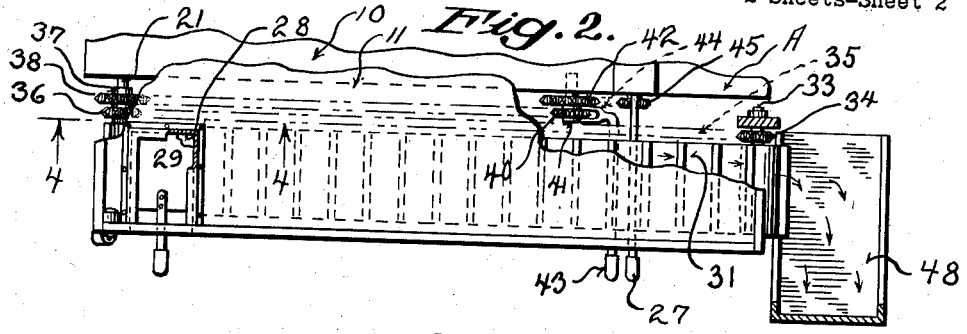
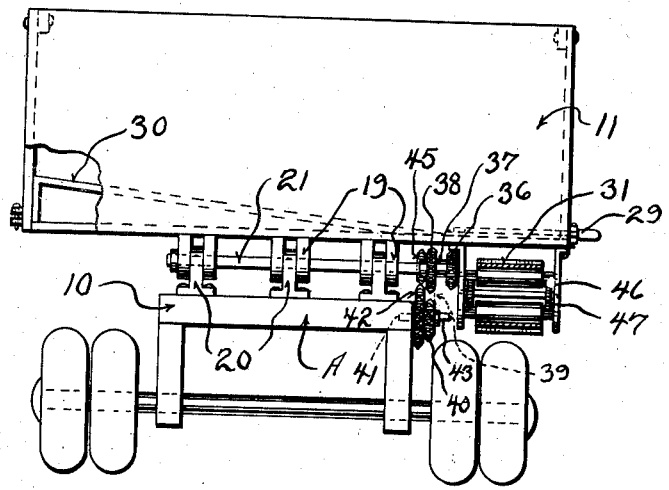
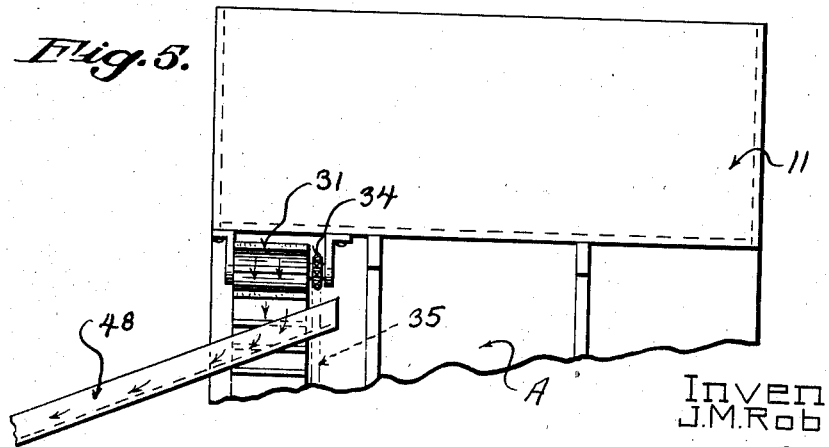
Inventor
J.M.Roberts
By
Attorneys Patented Feb. 25, 1941

2,233,111

UNITED STATES PATENT OFFICE.

2,233,111

DELIVERY TRUCK

Joel M. Roberts, Racine, Wis.

Application May 29, 1939, Serial No. 276,274

2 Claims. (Cl. 214—83)

This invention appertains to load-handling mechanism for trucks, and more particularly to novel means for delivering coal or like material to a desired point from a truck body.

Much difficulty has been experienced in delivering lump or granular material, such as coal, from a truck body into the cellar of a building. In order to obtain the necessary elevation, so that the load can be delivered by gravity down a chute into the building from the body, it has heretofore been proposed to lift the truck body as an entirety. This entails the use of expensive and complicated mechanism between the chassis and body for raising and lowering the body.

Therefore, one of the primary objects of my invention is to provide a tilting truck body of substantially ordinary character, so that the load will gravitate toward one end of the truck, with novel means for carrying the load from the lower end of the truck as the same gravitates therefrom to the elevated end of a chute or equivalent device, whereby the load can be quickly and expeditiously delivered to the desired point at a distance from the body.

A further important object of my invention is the provision of an endless conveyor mechanism carried directly by the truck body for receiving material from the lower end of the body when the same is tilted, with means for receiving material from the conveyor for directing said material by gravity to the desired place.

A further salient object of my invention is the provision of means for raising and lowering the body to and from a desired angle operated from the power plant of the truck.

A still further object of my invention is the provision of means for operating the endless conveyor from the power plant of the truck.

With these and other objects in view, the invention consists in the novel construction, arrangement, and formation of parts, as will be hereinafter more specifically described, claimed, and illustrated in the accompanying drawings, in which drawings:

Figure 1 is a fragmentary, side, elevational view of a truck constructed in accordance with my invention, the view being partly broken away and in section, and illustrating the body in its tilted position for delivering the load to the elevated end of a delivery chute.

Figure 2 is a fragmentary, top, plan view of the truck body, showing the conveyor mechanism carried thereby, and the chute for receiving the material from the conveyor.

Figure 3 is a rear elevational view of the truck constructed in accordance with my invention, showing parts thereof broken away and in section.

Figure 4 is an enlarged, detail, sectional view taken on the line 4—4 of Figure 2, looking in the direction of the arrows, illustrating a part of the driving mechanism for the endless conveyor.

Figure 5 is a fragmentary, inner, end, elevational view of the truck body, showing the body in its raised, tilted position for delivering material to the chute.

Referring to the drawings in detail, wherein similar reference characters designate corresponding parts throughout the several views, the letter A generally indicates an automotive delivery truck having a chassis 10 for supporting a tilting box body 11. The chassis 10 is connected by means of a turntable or fifth-wheel mechanism 12 with the wheeled chassis 13, which supports the power plant (not shown) and the truck cab (not shown).

From the description so far, it can be seen that the delivery truck is of the usual type employed by delivery houses, and, in accordance with my invention, the wheeled power chassis carries a drive shaft 14, which is driven from the engine. This shaft is connected to a longitudinally extending drive shaft 15 on the chassis 10 for the truck body 11 by means of a vertically extending jack shaft 16 located at the axial center of the turntable or fifth-wheel mechanism 12. As shown in Figure 1, the propeller shaft 14 is connected to the vertical shaft 15 by intermeshing beveled gears 17, and the upper end of the shaft 16 is connected to the shaft 15 by intermeshing beveled gears 18.

Referring more particularly to the truck body 11, it is to be noted that the rear end thereof carries depending hinge leaves or knuckles 19, which receive companion hinge leaves or knuckles 20 rigidly secured to the body chassis 10. A shaft 21 connects the knuckles 19 and 20 together, whereby the body 11 can be tilted on the body chassis 10 to elevate the inner end of the body, as shown in Figure 1.

Any conventional mechanism can be provided for raising and lowering the body on the shaft 21, and, thus, I have shown a conventional hydraulic ram or jack 22 for this purpose. The ram cylinder 23 is rigidly secured to the body chassis 10 and slidably receives the ram 24, the outer end of which is connected to the truck body 11 at a point spaced from the shaft 21. Fluid, such as oil, is delivered to and from the cylinder 23 by means of a pump 25. The pump can be provided with a drive shaft 26, and this drive shaft can be connected to the shaft 15 by the use of any desired type of clutch mechanism 27. By operating the clutch handle, the operation of the jack can be controlled.

In accordance with my invention, I provide the rear end of the body 11, at one side thereof, with an outlet delivery opening or port 28, and this opening can be normally closed by a hand-operated gate 29. Leading to the gate 29 and the opening 28 is a transversely extending inclined platform 30 in the truck body, so that when the body is in an elevated position, all of the load will be guided toward said opening.

In accordance with my invention, I arrange longitudinally of the body 11, at one side thereof, an endless conveyor 21, and the outer end of the conveyor is arranged under the opening 28, so as to receive material from the body. The inner end of the conveyor 31 is trained over a drive roller 32, keyed or otherwise secured to a shaft 33. This shaft is mounted in suitable bearings on the truck body, and also has keyed thereto a sprocket wheel 34, around which is trained a sprocket chain 35. This sprocket chain extends longitudinally of the body and is, in turn, trained about a relatively small sprocket wheel 36 mounted upon a sleeve 37. This sleeve 37 can be rotatably mounted on the shaft 21 and also has keyed thereto a sprocket wheel 38. The sprocket wheel 38 is driven from a sprocket chain 39, which is trained thereabout and over a sprocket wheel 40 rotatably mounted on a stub shaft 41 carried by the body chassis 10 adjacent the forward end thereof. The shaft 41 also has rotatably mounted thereon a relatively large drive sprocket wheel 42, and the sprocket wheel 40 is adapted to be operatively connected to the sprocket wheel 42 by means of a clutch 43 under control of the operator of the truck. The sprocket wheel 42 can be driven from a sprocket chain 44, and the sprocket chain 44 is, in turn, driven from a shaft 45, which is operatively connected to the drive shaft in any desired way.

The rear end of the endless conveyor 31 is trained about upper and lower idle rollers 46, and these rollers are mounted in suitable bearings carried by the outer end of the truck body. It is preferred to connect the idle rollers 46 together by idle gear wheels 47, so that the rollers 46 will operate in unison.

In use of my truck, the same is loaded with the desired material, such as coal, and when the truck reaches the point of delivery, the truck body 11 is raised to an inclined position, as shown in Figure 1, by the jack 22. An inclined delivery chute 48 is placed under the upper end of the endless conveyor 31, and the chute is then directed to the point where the load is to be delivered, such as in the cellar of a building through a window. The chute 48 can be supported in its inclined position in any desired manner.

The clutch 44 is now operated, so that the endless conveyor 31 will be constantly operated, and the gate 29 is now opened. The coal or other material will gradually fall through the opening 28 onto the lower end of the endless conveyor 31, and the endless conveyor will carry the material into the raised elevated end of the chute. The material will gravitate down the chute to the desired point. As the truck body is raised to an inclined position and the lower end of the body is provided with an inclined platform, all of the load will be conveniently and quickly delivered to the conveyor, and thence to the chute.

From the foregoing description, it can be seen that I have provided a truck for delivering coal and the like of exceptionally simple and durable construction, which will allow the convenient delivery of the load by gravity to the point of storage.

Changes in details may be made without departing from the spirit or the scope of my invention, but what I claim as new is:

1. A delivery truck comprising, a chassis, a body hingedly mounted at one end upon the chassis, said end having an outlet opening, a movable gate for closing said opening, and an endless conveyor arranged longitudinally of the body, extending from the low end to the high end when said body is tilted and having its lower end disposed under said opening, means for operating the endless conveyor, for carrying the load to an elevated position when the body is tilted.

2. A delivery truck comprising, a chassis, an engine-operated propeller shaft, a tilting body hingedly mounted at one end upon said chassis, said end having an outlet opening, means operated from the propeller shaft for swinging the body on said chassis, a longitudinally extending endless conveyor carried exteriorly of the body and movable therewith and extending from the low end of the body to the high end when the body is tilted, said conveyor, having the lower end thereof disposed under the opening, whereby to receive material from said body and elevate the same when the body is tilted, a movable gate for closing said opening, and means for operating the conveyor from the propeller shaft.

JOEL M. ROBERTS.